A. J. PURVIANCE.
Mode of Operating Horse Hay Forks.
No. 69,479.
Patented Oct. 1, 1867.
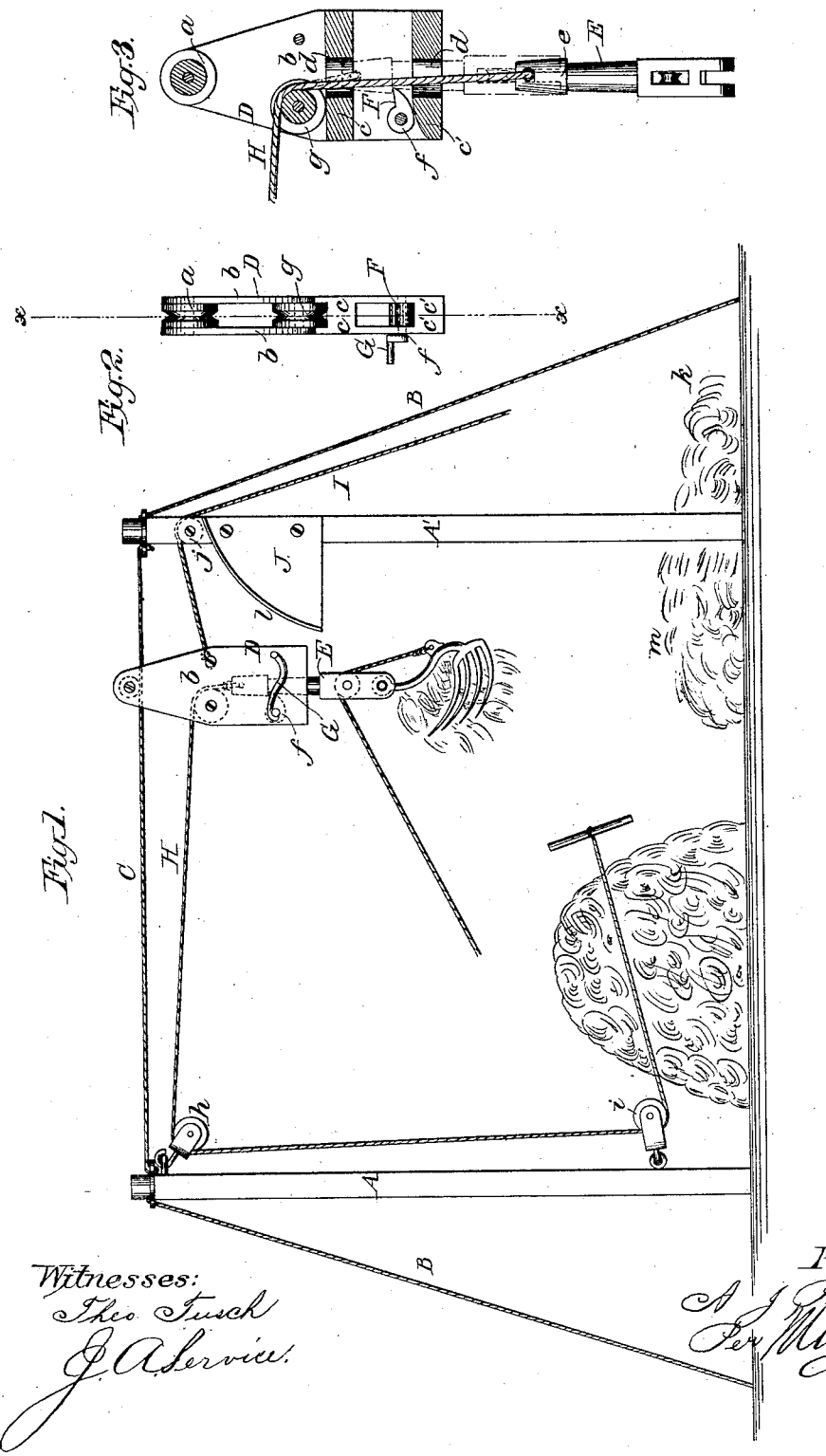

United States Patent Office.

A. J. PURVIANCE, OF KEOSAUQUA, IOWA.

Letters Patent No. 69,479, dated October 1, 1867.

---

IMPROVEMENT IN THE MODE OF OPERATING HORSE HAY-FORKS.

---

The Schedule referred to in these Letters Patent and making part of the same.

---

TO ALL WHOM IT MAY CONCERN:

Be it known that I, A. J. PURVIANCE, of Keosauqua, in the county of Van Buren, and State of Iowa, have invented a new and useful Improvement in Operating Horse Hay-Forks; and I do hereby declare that the following is a full, clear, and exact description thereof, which will enable those skilled in the art to make and use the same, reference being had to the accompanying drawings, forming part of this specification, in which—

Figure 1 is a side view of my invention complete.

Figure 2, an enlarged detached edge view of the conveyer pertaining to the same.

Figure 3, a section of the same taken in the line $x\ x$, fig. 2.

Similar letters of reference indicate corresponding parts.

This invention relates to a new and useful improvement in operating horse hay-forks, so that the same may not only be elevated as usual, but also drawn over the spot or stack where the hay is to be dropped or discharged. The object of the invention is to facilitate the stacking and storing away of hay with the horse hay-fork.

The following description refers to the stacking of hay by means of my improvement, but it is applicable also to the mowing or storing of hay in barns.

A A' represent two uprights of any suitable height, according to the size or height of the stack to be made. These uprights are driven into the earth, and supported by guy-ropes B. C is a line, rope, or chain, attached to the upper ends of the uprights A A', and strained as taut as may be, and D represents what may be termed a traveller or conveyer, in the upper end of which there is a roller, $a$, to work or run on the rope C. This conveyer may be of metal, composed of two plates $b\ b$, cast with horizontal ribs $c\ c'$ at their inner sides, which when the plates $b\ b$ are secured together form partitions, as shown clearly in figs. 2 and 3. These partitions have circular holes $d$ through them to allow a fork-head, E, to pass through, and within the conveyer there is a cam or catch, F, which when the head E is raised up within the conveyer catches under a shoulder, $e$, on the fork-head and sustains it in an elevated position, as shown in red in fig. 3. The cam or catch F is on a shaft, $f$, which is fitted transversely in the conveyer, and has one end projecting beyond the latter, with a crank, G, attached, (see figs. 1 and 2.) The hoisting-rope H is attached to the upper end of the fork-head E, and said rope passes over a pulley, $g$, in the conveyer D, and over a pulley, $h$, at the upper end of the uprights A, and extending down passes under a pulley, $i$, at the lower part of said upright, the horse being attached to its lower end. I is a cord or rope, attached to the conveyer D, and, passing over a pulley, $j$, in the upright A', extends down to the operator stationed at $k$, as shown in fig. 1. J is a projection attached to the upright A', and having its outer edge curved, forming a quarter circle, as shown at $l$ in fig. 1. Any suitable fork is attached to the head E.

The operation is as follows: The fork is supplied with its load at the point $m$, the head E being detached from the conveyer so that the fork may be lowered to the point specified. When the fork is loaded the horse is started and the loaded fork elevated, the operator holding the cord or rope I to prevent the conveyer being moved. The head E, as the fork reaches its culminating point, passes into the conveyer, and is caught and retained therein by the cam or catch F, and the operator, by releasing the cord or rope I, allows the conveyor and loaded fork to be drawn along on the line, rope, or chain C, over the spot or stack where the hay is to be discharged. The operator then trips the fork, and its load is allowed to drop upon the stack. The horse is then backed, and the operator, by pulling the cord or rope I, draws back the conveyer and empty fork over the spot $m$ where the fork is loaded, and as the conveyer reaches this point the crank G of the cam or catch F comes in contact with the curved surface of the projection J, and said cam or catch is actuated so as to release the fork-head E, and allow the empty fork to drop when it is loaded, raised as before, and drawn along over the stack, and its load discharged upon the latter. The arrangement is extremely simple and efficient, and admits of hay being stacked and stowed away with great facility.

Having thus described my invention, what I claim as new, and desire to secure by Letters Patent, is—

1. The conveyer D, provided with the horizontal ribs C C, having circular holes $d$, rollers $a\ g$, cam F, and cranks G, constructed as described for the purpose specified.

2. The projection J, in combination with the crank G and cam F, substantially as described for the purpose specified.

3. The fork-head E, provided with the shoulders $e$, whereby it is held in position by means of the cam F, as it enters the conveyer D, substantially as described for the purpose specified.

4. The combination of the fork-head E, conveyer D, cam F, crank G, and projection J, substantially as described.

A. J. PURVIANCE.

Witnesses:
W. M. McCRARY,
JOSEPH F. SMITH.